Figure 1:
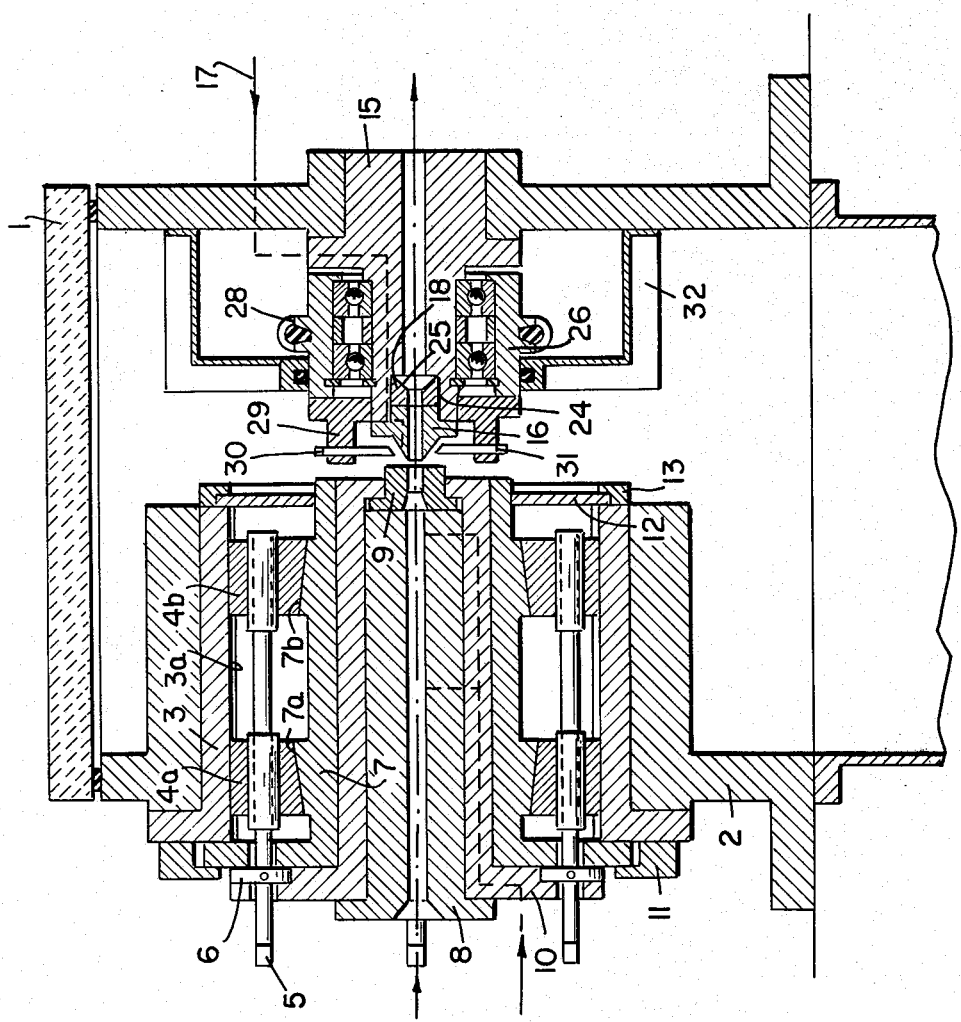

United States Patent
Ziemek et al.

[11] 3,911,541
[45] Oct. 14, 1975

[54] STRIPPING A SURFACE LAYER FROM AN ELONGATED METAL MEMBER SUCH AS A WIRE OR ROD

[75] Inventors: Gerhard Ziemek, Hannover; Harry Staschweski, Langenhagen; Kurt Mueller, Hannover, all of Germany

[73] Assignee: Kabel- und Metallwerke Gutehoffnungshutte Aktiengesellschaft, Germany

[22] Filed: Feb. 6, 1974

[21] Appl. No.: 440,243

[30] Foreign Application Priority Data
Feb. 10, 1973 Germany............................ 2306602

[52] U.S. Cl........................ 29/33 F; 29/557; 72/254
[51] Int. Cl.²......................................... B23P 25/00
[58] Field of Search................ 27/33 F, 557; 72/254

[56] References Cited
UNITED STATES PATENTS

| | | | |
|---|---|---|---|
| 2,255,096 | 9/1941 | Berkebil............................. | 29/33.51 |
| 2,394,381 | 2/1946 | Hoern................................. | 29/33.51 |
| 3,038,361 | 6/1962 | Holzer............................... | 29/33.51 |
| 3,444,603 | 5/1969 | Dion et al.......................... | 29/33.51 |

*Primary Examiner*—Harrison L. Hinson
*Assistant Examiner*—Leon Gilden
*Attorney, Agent, or Firm*—Marn & Jangarathis

[57] ABSTRACT

An elongated member is initially straightened and reduced in cross section by continuously feeding the member in a longitudinal path first through an elongated guide mechanism and then a drawing die attached to the output end of the guide mechanism. Positioned along and in approximate axial alignment with the longitudinal path of the elongated member is a cutting device positioned in close proximity to the output end of the drawing die so as to immediately strip chips of minute thickness from the surface of the straightened and reduced elongated member as it passes from the drawing die into the cutting device. The accumulation of the minute chips generated during stripping is limited by a clearing mechanism positioned in close proximity to the input end of the cutting device and adapted to rotate thereabout so as to continuously pulverize the chip accumulations beyond a predetermined distance from elongated member.

6 Claims, 2 Drawing Figures

STRIPPING A SURFACE LAYER FROM AN ELONGATED METAL MEMBER SUCH AS A WIRE OR ROD

BACKGROUND OF THE INVENTION

The present invention relates to an improved process and apparatus for stripping the surface of an elongated metallic member, such as wire or rod, for removing surface defects therefrom preparatory to, for example, continuous cladding of said member with a metallic material so as to achieve a high quality bond therebetween.

German Pat. No. 740,235 discloses a process and apparatus whereby the surfaces of rolled wires or rods are polished, brought through a drawing die through a guide mechanism and finally passed through a cutting device whose purpose is to remove irregularities and defects from the surface of the rods or wires. An additional drawing die has been provided with such apparatus at a point beyond the aforesaid cutting device so as to impart a greater mechanical hardness to the rod or wire surfaces as they are passed through the aforesaid mechanisms.

The instant process and apparatus is especially adapted to preparing the surfaces of an elongated metallic member for the subsequent cladding process of the type disclosed in U.S. Pat. application Ser. No. 192,188, filed on Oct. 26, 1971 and having the same assignee as this application.

An object of the instant invention is to produce elongated metallic members having surfaces that will be devoid of defects that will materially affect the formation of a high quality bonds between such surfaces and a metallic material that may be applied to such surfaces during a subsequent continuous cladding process.

The manner of achieving the aforesaid objective in accordance with the instant invention is to pass the elongated metallic members first through an elongated guide mechanism which may incorporate passages for the provision of lubricants or cooling liquids to be applied to the elongated member as it is being straightened by such guide mechanism; reducing the cross section of the straightened elongated member immediately upon its exit from the guide mechanism by passage of the member through a drawing die positioned at the output end of the guide mechanism; and immediately stripping the straightened and drawn down elongated member in such a manner as to assure that only minute metal chips result from such stripping and accumulations thereof are automatically and continuously limited by removal of the chips beyond a predetermined distance from the elongated member, for example, 5 mm.

The reduction of the cross section of the straightened and drawn down elongated member is preferably about 5 percent by area when such member is comprised of aluminum. As the drawing step immediately precedes the stripping step the small surface defects in the straightened elongated metal member are minimized by the smoothing action provided by the drawing die prior to stripping, while such member is prestressed so as to avoid the loss of temper during stripping. Further, since stripping takes place immediately after drawing or cross sectional reduction, high production rates do not materially affect the resulting surfaces of the elongated member after stripping.

In accordance with the teachings of the present invention, the chips formed during the stripping step are continuously removed from the surface of the elongated member so as to avoid the accumulation thereof at the cutting device which would hinder the free longitudinal movement of the elongated metallic member through the cutting device. The removal of the chips to a distance of at least 5 mm from the surface of the elongated metal member has been found to provide improved product surface characteristics while permitting free longitudinal movement of the elongated member through the cutting device.

It has been found advantageous, especially in stripping nonferrous elongated metallic members such as aluminum, to lubricate such members as they are being straightened during their passage through the guide mechanism, for example, by spraying or otherwise introducing alcohol on the surfaces of such members as they pass through the guide mechanism. In those instances where the elongated metallic members are comprised of oxidizable materials, the sequential steps of straightening, drawing and stripping of the elongated members may be appropriately performed in protective gas atmospheres so that the elongated members processed in this way may be further processed during a subsequent continuous cladding process without detrimental effects to the formation of a high quality bond between the surfaces of the elongated members and the metallic cladding material to be subsequently applied thereto.

In accordance with the instant invention the guide mechanism, the drawing die and the cutting tool for stripping the elongated member are all positioned along the longitudinal path of travel of the elongated member, the cutting tool being located at a distance amounting to a maximum of 6 mm from the output end of the drawing die in the direction of the travel of the elongated member. This small distance between the drawing die and the cutting tool makes it possible to obtain metal chips that are scarcely 1/10th of an inch thick which may be efficiently removed so as to avoid excessive accumulation thereof that would hinder free longitudinal movement of the elongated member. Further, in accordance with the instant invention the drawing die is mounted upon the output end of the guide mechanism and such combination is mounted in a positioning mechanism for adjusting axial alignment thereof with respect to the cutting tool.

In the preferred embodiment of the invention, the cutting tool is provided with one or more passages to accommodate a cooling and lubricating system. With nonferrous elongated members which are amenable to cold welding, it is preferable to use alcohol in such system as the cooling agent. Where the instant process of straightening, drawing and stripping of an elongated member are to be performed within a protective gas atmosphere, it is preferable to enclose the cutting tool in a housing that opens downward, or that at least possesses openings facing downwards through which the minute chips may be removed. It has been found especially advantageous to place a lathe tool at approximately 5 mm from the stripped member, in order to provide for pulverization of the accumulating minute chips.

Various other objects and advantages of the invention will become clear from the following description of the preferred embodiment thereof, and the novel features will be particularly pointed out in connection with the appended claims.

THE DRAWINGS

Figure 2:
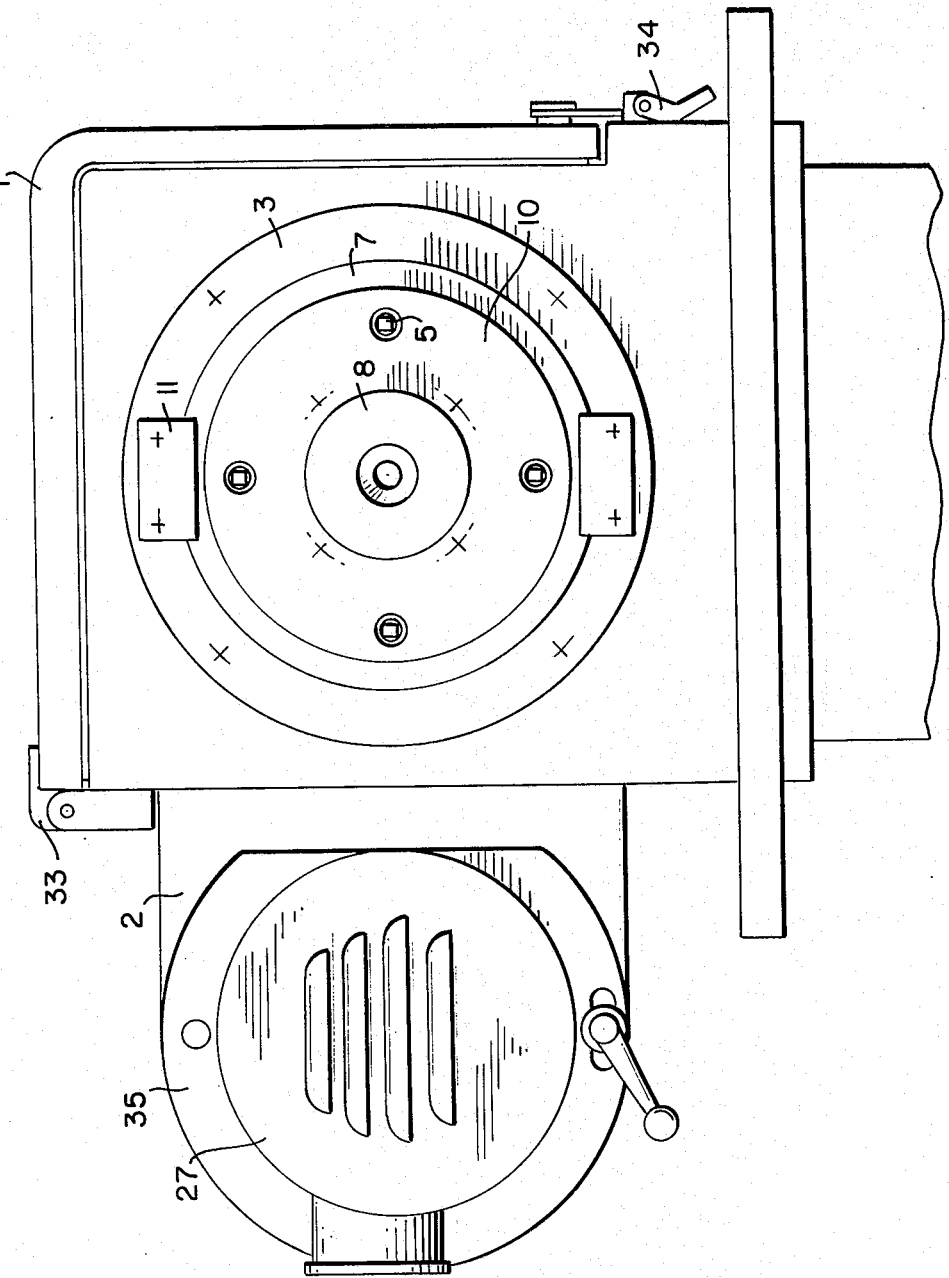

Reference will hereafter be made to the accompanying drawings wherein:

FIG. 1 is a simplified, cross-section side elevation view of the equipment for carrying out the instant invention; and FIG. 2 is an elevation view of such equipment as viewed from the end from which the elongated metallic member enters the equipment.

SUMMARY AND DESCRIPTION OF PREFERRED EMBODIMENT

With reference to FIGS. 1 and 2, in order to make possible the stripping of an elongated metallic member with oxidizable surfaces, the stripping operation is performed in a controlled environment enclosure 2 having a cover 1 through which a protective gas may be introduced, via ducts, details of which are not depicted. Within the enclosure 2 there are provided, in concentric relation to each other: a support sleeve 3 maintained in a fixed position by the atmosphere enclosure 2; a positioning mechanism comprising a pair of guide dies 4a and 4b that are capable of movement back and forth in the axial direction by means of an adjusting spindle 5 with attached disc 6; a guide adjustment sleeve 7 positioned within said positioning mechanisms and having inclined plane surfaces 7a and 7b which engage the inclined planes of the guide dies 4a and 4b, respectively; a guide housing 10 positioned within said guide adjustment sleeve 7; and an elongated guide 8 positioned within the housing 10. The elongated guide 8 has an elongated aperture that extends therethrough and which is in axial alignment with the aperture of a drawing die 9 attached to and supported by the output end of the elongated guide 8. By adjusting the spindle 5 so as to vary the axial displacement of the guide dies 4a and 4b the guide adjustment sleeve 7, the guide housing 10, and the elongated guide 8 and attached drawing die 8 may be moved in a plane perpendicular to the common axis of the concentric members. Thus the longitudinal path of the elongated member through the elongated guide 8 and the drawing die 9 may be adjusted to achieve the desired axial alignment with respect to a cutting tool 16 positioned in close proximity to the output end of the drawing die 9.

FIG. 1 depicts two of the four sets of guide dies 4a and 4b which may be displaced by means of the adjustment of the associated spindle 5. Spindle 5 is provided for this purpose with two threads, one left-handed and the other right-handed. The four sets of guide dies are ranged at 90° intervals from each other so as to make possible an adjustment of the elongated guide 8 and the drawing die 9 in a rectangular system of coordinates. The guide dies 4a and 4b are held in grooves 3a of the support sleeve 3, and the sleeve of the inclined planes on guide adjustment sleeve 7 being counter-balanced by the slope of the inner operating surface of the guide dies 4a and 4b. When the drawing die 9 is adjusted, which is necessary when the elongated member is to be stripped on only one side, and for this reason must be brought into a central position with respect to the cutting tool 16, the adjusting spindles 5 lying along the axis of displacement must rotate in opposite directions at the same time. Each disc 6 holds its associated spindle 5 in its axial position between guide adjustment sleeve 7 and guide housing 10 and insures a uniform displacement of the guide dies 4a and 4b. Two clamp straps 11 hold the drawing die adjustment of the support sleeve 7 in place, sleeve 7 in turn being fastened by screws to the atmosphere enclosure 2. A packing washer 12 protects the adjustment mechanism from the minute metal chips generated in the inner chamber of the cutting tool 16, and keeps the lubricant from leaking out of the guides. A flange 13 holds the packing washer 12 in place on the support sleeve 3.

The cutting tool 16 is attached to a receiving housing 15, the distance between the cutting tool 16 and the drawing die 9 being kept at a minimum by means of the structural configuration of guide housing 10 and the receiving housing 15. A channel 17 is provided in the receiving housing 15 to introduce a suitable lubricant such as alcohol to the cutting tool 16. Lubrication holes run through the cutting die 16, preferably to the vicinity of the cutting area, so as to provide a constant lubrication of the edges of the cutting tool 16 coming into contact with the elongated member passed therethrough. The number of holes in the cutting die may be made conformable to the particular conditions under which the stripping is to be performed.

Inside the receiving housing 15 to which the cutting tool 16 is attached, a round gasket 18 is provided for preventing leakage of the lubricant in the direction of travel of the elongated member through an elongated aperture in the receiving housing 15. This gasket is held under pressure to the cutting tool 16, via a pressure ring 24, by means of a spring 25.

A chip clearing mechanism 26 is rotatably mounted on the receiving housing 15 by means of roll bearings and is driven by an electric motor 27 depicted in FIG. 2, a belt drive 28 being provided for transmitting the power from the motor. A flange 29 on the clearing mechanism 26 is fastened to a bracket supporting a pair of lathe tools 30 and 31. Lathe tools 30 and 31 are positioned at different distances from the cutting edges of the cutting tool 16, in terms of measurements longitudinal and transverse to the axis of the cutting tool 16. A variety of lathe tool arrangements may be used depending upon the material of which the elongated member is comprised.

The drive belt 28 and the chip clearing mechanism 26 are protected from the minute chips and the lubricant by a belt casement 32. A chip box may be attached to the underside of the enclosure 2 for removal of the chips to a conventional chip transport. The bottom of the chip box may be advantageously provided with a screen and a tubular passageway for the removal of lubricant runoff. As illustrated in FIG. 2, the drive motor 27 is of "flange" construction and is fastened to a rotatable bracket 35 which permits adjustment of the tension of the drive belt 28. Cover 1 is fastened to the enclosure by means of a hinge 33 and a lock 34.

Various changes in the steps and arrangements of parts which have been herein described and illustrated in order to explain the nature of the invention, may be made by those skilled in the art within the principal and scope of the invention as defined in the appended claims.

We claim:

1. Apparatus for continuously stripping the surface of an elongated metallic member, comprising an elongated guide means having an aperture therethrough for the continuous passage of an elongated metallic member in a longitudinal path, said aperture having a cross section such that said elongated guide engages said metallic member over an extended longitudinal length for straightening said metallic member as it passes therethrough, draw die means fixedly attached to the output end of said elongated guide means and axially aligned with said aperture therethrough, said draw die means having a die cross section smaller than that of said guide aperture for reducing the cross section of the elongated metallic member, immediately upon said elongated metallic member being straightened, for the initial removal of minor surface defects;

cutting means comprising a shaving die axially aligned with said longitudinal path and positioned at a maximum distance of about 6 mm from the output end of said draw die means for stripping a surface of said elongated member immediately after it has been reduced in cross section by said draw die means; and chip clearing means comprising a clearing tool adapted to be revolved about said cutting means, said clearing tool being positioned laterally a distance removed from the input end of said cutting means and the surface of the elongated metallic member by no more than amout 5 mm, so as to engage the accumulation of chips of minute thickness extending from the input of said cutting means.

2. Apparatus in accordance with claim 1, wherein said die cross section of said draw die means is smaller than that of said die aperture by about 5% for the initial removal of minor surface defects in the straightened elongated metallic member.

3. An apparatus in accordance with claim 1, wherein said guide means comprises a positioning means for adjusting the axial alignment of the die means with respect to said cutting means.

4. Apparatus in accordance with claim 1, wherein the said die means includes at least one channel for the introduction of a coolant or lubricant agent.

5. Apparatus in accordance with claim 1, wherein said guide means includes passages for the application of lubricant or cooling agents to the elongated metallic member as it is continuously passed through said guide means.

6. Apparatus in accordance with claim 1, comprising a housing encasing about said guide means, said die means, said cutting means and said clearing means, said housing being adapted to permit the continuous passage of the elongated metallic member therethrough while maintained a protective gas atmosphere about the aforesaid means.

* * * * *